United States Patent [19]

McRoberts et al.

[11] Patent Number: 4,694,300

[45] Date of Patent: Sep. 15, 1987

[54] APPARATUS FOR PROVIDING CONSTANT AZIMUTH CELLS IN AN AIRBORNE RADAR

[75] Inventors: Louis A. McRoberts, Scottsdale; Arthur Felix, Jr., Phoenix, both of Ariz.

[73] Assignee: Motorola, Inc., Schaumburg, Ill.

[21] Appl. No.: 561,419

[22] Filed: Dec. 14, 1983

[51] Int. Cl.$^4$ .............................................. G01S 13/90
[52] U.S. Cl. ..................................... 342/195; 342/25; 342/176
[58] Field of Search .............. 343/5 CM; 342/25, 176, 342/179, 195

[56] References Cited

U.S. PATENT DOCUMENTS 4,339,752  7/1982  Williams et al. ................. 343/5 CM
4,551,724  11/1985  Goldstein et al. ..................... 342/25

Primary Examiner—T. H. Tubbesing
Assistant Examiner—Gilberto Barrón, Jr.
Attorney, Agent, or Firm—Eugene A. Parsons

[57] ABSTRACT

In a side looking radar, electronic timing circuits for dividing the radar beam into a plurality of groups of azimuth cells of equal size, the switching circuits being dependent upon the number of pulse repetition intervals per unit of travel to maintain the size of the azimuth cells in the different groups relatively constant. The apparatus also contains circuitry for scaling the output in each of the different azimuth groups.

6 Claims, 3 Drawing Figures

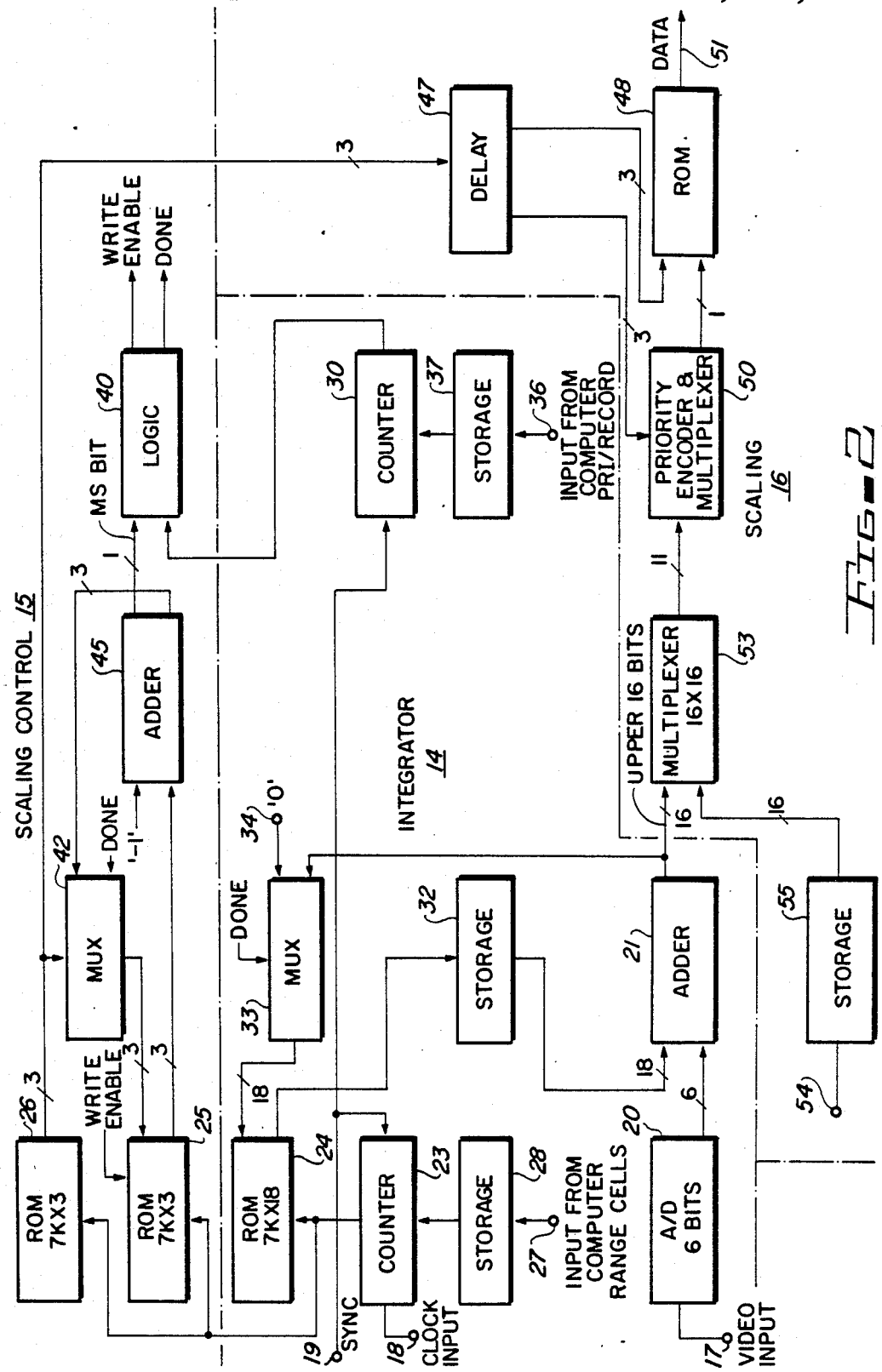

APPARATUS FOR PROVIDING CONSTANT AZIMUTH CELLS IN AN AIRBORNE RADAR

BACKGROUND OF THE INVENTION

In radars providing a visual presentation of the returns from the illuminated terrain, such as side looking radars, the beam is divided longitudinally into a plurality of range bins, each of which represents a specific amount of travel of the radar signal in a longitudinal direction. As a specific example, each bin in the present disclosure represents 30 meters of ground travel of the radar signal. The radar visual display is a cathode ray tube (CRT) on which the display is actually composed of a plurality of pixels. Each pixel is generally considered to be rectangular and the dimensions, height and width, are referred to as the aspect ratio. For example, if the aspect ratio is 1 to 1 and a range bin is 30 meters long the pixel will represent an area 30 meters by 30 meters. However, for an aspect ratio of 4 to 3, wherein the range bins are 30 meters, the azimuth dimension of the pixel will be 22.5 meters. Also, the aspect ratio of the pixels determines the overall dimensions of the display.

Radars are normally pulsed many times per second and the interval between pulses is the time during which return signals are received. This pulse repetition interval (PRI) may be changed during operation of the radar for various reasons. When the PRI of the radar is changed or when the ground speed of the airplane carrying the radar is changed, the amount of terrain covered in each range bin in the azimuth direction, will vary. The returns in each range bin are integrated for a number of PRI to provide the video data for each pixel. Also, the system usually is a dual system alternately covering the terrain on both sides of the airplane.

In the prior art, the radar beam is divided into transversly extending azimuth cells with the transverse dimension of the azimuth cell being determined by a fixed number of PRI. Since the radar operator may vary the number of PRI per unit of time and since the ground speed of the airplane carrying the radar may vary, the transverse distance of the azimuth cells will vary substantially, which will radically alter the aspect ratio of the pixels and the visual display. These radical changes in the azimuth cell size make it very difficult, if not impossible, to scale the output for display on a raster scan CRT.

SUMMARY OF THE INVENTION

The present invention pertains to apparatus and method for providing azimuth cells having a relatively constant size wherein the integrating apparatus of the radar integrates PRI's over a predetermined and measured amount of movement of the airplane carrying the radar relative to the ground. Thus, the number of PRI integrated in an azimuth cell will vary but the actual transverse dimension of the azimuth cell, will remain constant. The transverse dimension of the azimuth cells is related to the longitudinal dimension of the range bins to provide the desired aspect ratio in the pixels and the visual display. Further, the video data output from the various azimuth cells is scaled so that target returns of the same size at different distances provide the same amplitude of video data output.

It is an object of the present invention to provide new and improved apparatus for providing azimuth cells having a relatively constant size in a radar beam.

It is a further object of the present invention to provide new and improved apparatus for providing azimuth cells having a relatively constant size for all ground speeds and ranges.

It is a further object of the present invention to provide new and improved apparatus for providing azimuth cells having a relatively constant size wherein the apparatus is relatively simple to implement and minimizes the amount of hardware required.

These and other objects of this invention will become apparent to those skilled in the art upon consideration of the accompanying specification, claims and drawings.

BRIEF DESCRIPTION OF THE DRAWINGS

Referring to the drawings;

FIG. 2 is a block diagram of apparatus including an integrater and scaling circuits for an airborne side looking radar, which apparatus includes an embodiment of the present invention.

DESCRIPTION OF THE PREFERRED EMBODIMENT

Figure 1:
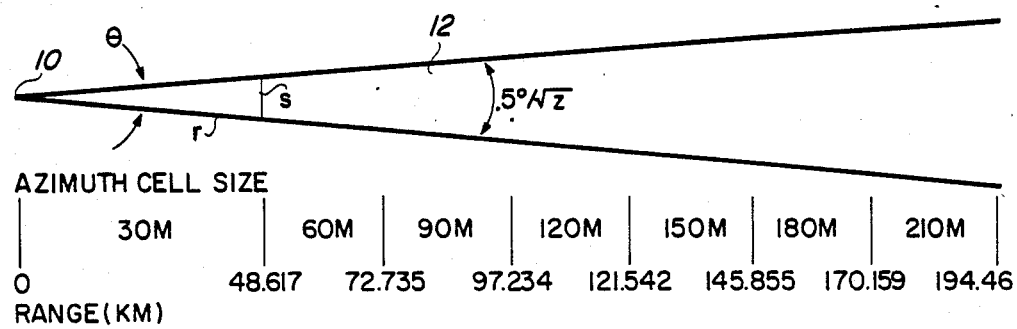
FIG. 1 graphically depicts the spreading of the radar beam and the ranges for different azimuth cell sizes.

Referring specifically to FIG. 1, a radar is depicted as a point source of energy at point 10. The energy radiated from the radar at point 10 spreads to form the radar beam 12. The radar beam is divided into seven groups each having different azimuth cells sizes. In the present embodiment the radar signal travels 30 meters between samples so that each range bin has a longitudinal dimension of 30 meters. Also, in this specific example, the aspect ratio of the pixels is 1 to 1 so that the azimuth cell sizes are 30 meters or multiples thereof. Thus, in the first group of azimuth cells, which extends from the range 0 to 48.617 kilometers, the azimuth cells have a transverse dimension of 30 meters. In the second group of azimuth cells, extending from the range of 48.617 kilometers to 72.925 kilometers, the azimuth cells have a transverse dimension of 60 meters. Similarly, in groups 3 through 7 the azimuth cells have a transverse dimension of 90 meters, 120 meters, 150 meters, 180 meters and 210 meters. The ranges of the various azimuth cell groups are computed by dividing the desired number of azimuth cells positioned side-by-side transversly across the radar beam (in this embodiment 5 for all except the first group) times the desired azimuth cell size by the beam width (in radians). This computation evolves from the well known equation for determining the length of an arc, $s = r\theta$ where theta is the spreading angle of the radar beam, r is the radius and s is the arc intercepted at the radius r. For very small angles, such as those inscribed by a radar beam, the arc s is essentially a straight line. Table 1 summarizes the data in FIG. 1 and shows the number of azimuth cells positioned side-by-side transversly across the radar beam for the different ranges. From Table 1 it can be seen that the radar beam 12 expands in the first group of azimuth cells from one azimuth cell to 10 at the range of 48.617 kilometers. The remaining six groups of azimuth cells contain 5 cells at the lower range thereof and expand slightly in the upper ranges. Obtaining exactly 5 azimuth cells across the beam is not possible assuming that integer multiples of 30 meters are used. However, at long ranges, the approximation is, close.

TABLE 1

| RANGE (KM) | | RANGE BIN NUMBER | | AZIMUTH CELL SIZE | NUMBER OF AZIMUTH CELLS |
|---|---|---|---|---|---|
| MIN | MAX | MIN | MAX | | |
| 4.061 | 48.617 | 163 | 1621 | 30 M | 10 |
| 48.617 | 72.925 | 1622 | 2431 | 60 M | 7.5 |
| 72.925 | 97.234 | 2432 | 3242 | 90 M | 6.66 |
| 97.234 | 121.542 | 3243 | 4052 | 120 M | 6.25 |
| 121.542 | 145.855 | 4053 | 4862 | 150 M | 6.0 |
| 145.855 | 170.159 | 4863 | 5672 | 180 M | 5.833 |
| 170.159 | 194.468 | 5673 | 6483 | 210 M | 5.71 |

Referring specifically to FIG. 2, apparatus for receiving outputs from a side looking radar, including an integrator 14, scaling control 15 or timing circuitry and scaling circuits 16, for providing azimuth cells having a relatively constant size, is illustrated. The radar, illustrated as point source 10 in FIG. 1, supplies video input signals on a terminal 17, clock input signals on a terminal 18 and synchronizing pulses on a terminal 19. The video input signals supplied to terminal 17 by the radar 10 are analog signals which are connected to an analog to digital converter 20. Converter 20 converts the analog signal into a 6 bit digital signal which is supplied to digital adder 21. Since the analog video input signals are converted to 6 bit digital signals, the range of amplitudes of the digital signals is 0 to 63. It will be seen from FIG. 2 that converter 20 and adder 21 form a portion of integrator 14.

The clock input on terminal 18 is supplied to a digital counter 23 and each clock pulse clocks an output from counter 23 to a random-access-memory (RAM) 24, a RAM 25 and a read-only-memory (ROM) 26. At terminal 27 connected to receive from a computer (not shown) associated with the radar 10 the number of range cells to be integrated in each instance. The terminal 27 is connected to a storage unit 28 for storing the maximum range cell number and the output thereof is connected to a second input of counter 23. Synchronizing pulses from the radar 10 are supplied to terminal 19 which is connected to a third input of counter 23 and to a first input of a counter 30. The output of RAM 24, which is an 18 bit digital output, is supplied to a storage unit 32, the output of which is connected to a second input of adder 21. Adder 21 supplies an 18 bit digital sum signal to one input of a multiplexing unit 33. The multiplexing unit 33 has a second input, illustrated as terminal 34, which always has a digital zero supplied thereto. The output of multiplexing unit 33, which is an 18 bit digital signal, is supplied to the RAM 24 and is connected so that the 18 bit signal is written into the same address from which the 18 bit signal supplied to storage unit 32 is read.

A terminal 36 is adapted to receive from the computer associated with radar 10 an input signal representative of the number of PRI per record, or in this instance the number of PRI per 30 meters of ground travel. The signal supplied to terminal 36 is connected to an input of a storage unit 37, the output of which is connected to a second input of counter 30. The output of counter 30 is connected to a first input of a logic unit 40 having two outputs, a write enable output and a done output. The done output of logic unit 40 is connected to the control input of multiplexing unit 33 and to the control input of a second multiplexing unit 42. The write enable output is connected to a control input of RAM 25. An output of RAM 25, which is a 3 bit digital signal, is applied to an input of an adder 45. A second input of adder 45 has a constant digital single representative of a negative 1 applied thereto. An output of adder 45, which is the most significant bit, is applied to a second input of logic unit 40. A second output of adder 45, which is a three bit digital word, is supplied to an input of the multiplexing unit 42. A second input of the multiplexing unit 42 is supplied from ROM 26. The output of multiplexing unit 42 is connected to an input of RAM 25. As illustrated by the dotted lines in FIG. 2, RAM 25, ROM 26, multiplexing unit 42, adder 45 and logic unit 40 generally make up the scaling control 15.

The output of ROM 26 is also connected to a digital delay 47. Delay 47 has true output, which is connected to three most significant address lines of a ROM 48, and a complementary output, which is connected to a control input of a priority encoder and mutliplexer 50. The output of the priority encoder and multiplexer 50, which is a seven bit digital line, is connected to 7 least significant additional address inputs of ROM 48. Output data from the apparatus is available at a terminal 51 connected to the output of ROM 48. Sixteen most significant bits from the 18 bit output of adder 21 are connected to the input of a multiplier 53. An input terminal 54, connected to the computer associated with radar 10, receives digital signals representative of the quotient one over the number of PRI's being utilized. The quotient applied to terminal 54 is stored in storage unit 55. In actuality, storage unit 55 may be a look-up table containing a number of quotients equal to one over all of the possible PRI's which may be utilized. The input signal at terminal 54 selects the quotient, one over the PRI presently being utilized by the radar, and provides that quotient to an input of multiplier 53. Actually, the integration output from adder 21 is divided by the number of PRI that occurred in thirty meters of travel and it is then divided by the number of 30 meter intervals of that azimuth cell. However, because of the time and apparatus required in the division operation a multiplier and storage or look-up table is used to implement the division operations. The output of multiplier 53, which uses 11 of 16 output bits, is supplied to an input of the priority encoder and multiplexer 50. The output of ROM 26 which is supplied to ROM 48 and priority encoder and multiplier 50 through delay 47, must be delayed by one clock period to account for the time required by multiplier 53.

The operation of integrator 14 is as follows. The integration for one PRI starts when a synchronization pulse is received in counter 23, which loads into counter 23 from storage 28 the number of range cells that will be integrated. The output from counter 23 is the address inputs for RAM 24, RAM 25 and ROM 26. The video input at terminal 17 is applied to analog to digital converter 20, the six bit output of which goes to adder 21. At the same time, the current sum, which is at the address designated by counter 23 in RAM 24, is stored in storage unit 32 and applied to adder 21. The current sum is added to the digitized video in adder 21 and written back into RAM 24 by way of multiplexing unit 33 at the same address. A clock input to counter 23 decrements counter 23 and the process is repeated. This operation, essentially a read-modify-write cycle, continues until all of the range cells have been processed, 6483 cells for a range of 194.49 kilometers. The read-modify-write cycle must be done in less than 200 nanoseconds, the time before the next radar pulse or synchronization pulse, so high speed devices are required.

Storage unit 37 contains the number of PRI that will occur while the aircraft travels a unit distance, in this embodiment 30 meters. Counter 30 is decremented by the synchronization pulse at the start of each integration. During the first group of azimuth cells which are 30 meters wide, when counter 30 reaches 0 the done line is asserted. The output of adder 45, which is also supplied to logic unit 40, provides signals indicative of the specific of number of azimuth cells being integrated so that the done line is not asserted until the correct amount of ground travel has been attained. With the done line asserted, multiplexing unit 33 will steer a logic 0 to RAM 24 which will be stored. This 0 initializes RAM 24 for the start of the next integration period.

The purpose of scaling control 15 is to determine when the integration for the different azimuth cell sizes is complete. When the integration is complete, the appropriate section in RAM 24 must be initialized to 0 and a flag generated to indicate that data is available at the output.

The contents of RAM 25 and ROM 26 are, at initialization only:

| ADDRESS (range cell) | CONTENTS |
|---|---|
| 0 to 1621 | 0 |
| 1622 to 2431 | 1 |
| 2432 to 3242 | 2 |
| 3243 to 4052 | 3 |
| 4053 to 4862 | 4 |
| 4863 to 5672 | 5 |
| 5673 to 6483 | 6 |

The output of counter 23 is applied to the address lines of RAM 25. During the integration process, RAM 25 is accessed and a digital minus one is added to its output in adder 45, the sum of which is connected to multiplexing unit 42 and logic unit 40. If counter 30 is not at 0, the done line cannot be asserted by logic unit 40, the write line is not enabled and the output of multiplexing unit 42 is not written into RAM 25. When the output of counter 30 is 0, the output of RAM 25 is decremented by the minus one in adder 45 and the result is written back into RAM 25 by way of multiplexing unit 42, if the sum at the output of adder 45 is positive (greater than or equal to zero). If the sum at the output of adder 45 is negative, the done line is asserted and the contents of the corresponding location in ROM 26 are routed through multiplexing unit 42 and written into RAM 25 (the write enable line is asserted).

For example, assume that RAM 25 was just initialize and contains the data in the above list. After the aircraft travels 30 meters, counter 30 is at 0. The output of adder 45 is negative for range cells 1 to 1621 and the outputs of ROM 26 for each range cell are routed through multiplexing unit 42 and written into RAM 25 at the addressed locations. Table 2 shows the contents of RAM 25 after 30 meters, 60 meters, 90 meters . . . 210 meters of travel. RAM 25 is initialized by asserting the done line and enabling the write line for one PRI, which action will also load 0 into all locations of RAM 24. Thus, in the present embodiment RAM 24 of integrator 14 is controlled so that integrator 14 integrates PRIs through 30 meters of ground travel for all of the azimuth cells in the first group, 60 meters of ground travel in the second group, 90 meters of ground travel in the third group, etc. Further, the logic unit 40 provides a done signal which operates a flag to external apparatus receiving the output data from ROM 48, to indicate that the output data at terminal 51 is valid or completed data. In actual practice it may be necessary to delay the done signal some amount so that it coincides with the receipt of data at the external equipment, however, such adjustments are well known to those skilled in the art and will not be elaborated upon in this disclosure.

TABLE 2

| RANGE IN RANGE BINS | DISTANCE TRAVELED | | | | | | | |
|---|---|---|---|---|---|---|---|---|
| | 0 | 30 M | 60 M | 90 M | 120 M | 150 M | 180 M | 210 M |
| 1 to 1621 | 0 | 0* | 0* | 0* | 0* | 0* | 0* | 0* |
| 1622 to 2431 | 1 | 0 | 1* | 0 | 1* | 0 | 1* | 0 |
| 2432 to 3242 | 2 | 1 | 0 | 2* | 1 | 0 | 2* | 1 |
| 3243 to 4052 | 3 | 2 | 1 | 0 | 3* | 2 | 1 | 0 |
| 4053 to 4862 | 4 | 3 | 2 | 1 | 0 | 4* | 3 | 2 |
| 4863 to 5672 | 5 | 4 | 3 | 2 | 1 | 0 | 5* | 4 |
| 5674 to 6483 | 6 | 5 | 4 | 3 | 2 | 1 | 0 | 6* |

*Indicates which range bins have been integrated and are ready to scale then output As explained briefly above, the output from integrator 14 must be divided by the number of PRI that occurred in the specific azimuth cell being operated upon. In general, this means that the integration output is divided by the number of PRI that occurred in 30 meters of travel and then divided by the number of 30 meter intervals for that azimuth cell. However, a number equal one over the number of PRI that occurred in 30 meters is stored in storage unit 55 and multiplied times the output from integrator 14 in multiplier 53. In general, these scaling requirements are derived from the data in Table 3. Table 3 was constructed by assuming values of 63 and 1, the maximum and minimum possible values of data from converter 20, respectively, which values were integrated for 121 PRI and the resulting sum is the output of adder 21. This number of PRI's assumes that the ground speed is 180 knots and the pulse repetition rate of the radar is 750 pulses per second both sides (375 PRI per side). For different ground speeds and pulse repetition rates the information in storage unit 55 is altered accordingly.

TABLE 3

| Number of 30 M Intervals | Data Input For each PRI Decimal | Multiplier Output MS 16 Bits | Multiplier Output - MS Word Lower 12 Bits Bit 11    0 | Multiplier Bits Used as Input to ROM | Magnitude of ROM Input Hex | Decimal |
|---|---|---|---|---|---|---|
| 1 | 63 | 00FB | 000011111011 | 1 to 7 | 7D | 125 |
| | 1 | 0003 | 000000000011 | 1 to 7 | 01 | 1 |
| 2 | 63 | 01F7 | 000111110111 | 2 to 8 | 7D | 125 |
| | 1 | 0007 | 000000000111 | 2 to 8 | 01 | 1 |
| 3 | 63 | 02F3 | 001011110011 | 3 to 9 | 5E | 94 |
| | 1 | 000B | 000000001011 | 3 to 9 | 01 | 1 |
| 4 | 63 | 03F0 | 001111110000 | 3 to 9 | 7E | 126 |
| | 1 | 0010 | 000000010000 | 3 to 9 | 01 | 1 |
| 5 | 63 | 04EB | 010011101011 | 4 to 10 | 4E | 78 |

TABLE 3-continued

| Number of 30 M Intervals | Data Input For each PRI Decimal | Multiplier Output MS 16 Bits | Multiplier Output - MS Word Lower 12 Bits Bit 11    0 | Multiplier Bits Used as Input to ROM | Magnitude of ROM Input Hex | Magnitude of ROM Input Decimal |
|---|---|---|---|---|---|---|
|  | 1 | 0013 | 000000010011 | 4 to 10 | 1 | 1 |
| 6 | 63 | 05E7 | 010111100111 | 4 to 10 | 5E | 94 |
|  | 1 | 0017 | 000000010111 | 4 to 10 | 1 | 1 |
| 7 | 63 | 06E3 | 010111100011 | 4 to 10 | 6E | 110 |
|  | 1 | 001B | 000000011011 | 4 to 10 | 1 | 1 |

Assumes:
G.S. = 180 knots
750 PRI - Both Side
1/121 = 0.21 D9E$_{16}$

The data from integrator 14 is right shifted twice, by wiring, when used as the input to multiplier 53 due to the 16 bit limitation of available LSI multipliers.

The most significant 16 bits of the product output for multiplier 53 are shown in the third column (to the base 16) in Table 3 and the least significant 11 bits of these 16 are shown in the fourth column to the base two. The fifth column lists the output bits of multiplier 53 that are used as the seven low order address inputs for ROM 48. The last two columns in Table 3 contain the range of the input addresses, in base 16 and base 10 respectively of ROM 48. The use of 7 ROM address bits was chosen to obtain outputs of 0 to 63. If 6 bits were used, azimuth intervals 3, 5, 6 and 7 would have a range of less than 0 to 63 which is less than the desired resolution. The last two columns of Table 3 show the range of the seven low order address bits supplied to ROM 48 for each of the azimuth cell sizes. Since the ranges are different, except for intervals for azimuth groups 1 and 2, a 1k by 8 ROM is utilized for ROM 48 and subdivided into eight 128 byte segments. To accomplish this subdivision, the 3 address bits supplied by ROM 26 through delay 47 are utilized to select the specific one of the eight segments which corresponds to the azimuth group being operated upon and the 7 address bits from the priority encoder and multiplexer 50 are utilized to select the specific output of the 128 byte segment. Each address of each segment is encoded to provide a 6 bit output, when addressed, which corresponds to the correct amplitude in the range 0 to 63.

The multiplexer portion of circuit 50 is made up of four dual 4 to 1 multiplexers, such as the commerically available multiplexers sold under part number SN74LS253, which multiplexers are connected to each receive 4 inputs from the multiplier 53 and the 2 bit selection signal from the priority encoder of circuit 50. The selection process is wired so that when the 3 selection bits are 0 the first input to each of the multiplexers is selected, when binary 1 (001) is represented the second input to each of the multiplexers is selected, when a binary 2 or 3 (010 or 011, respectively), is represented, the third input to each of the multiplexers is selected and when a decimal 4, 5, 6 or 7 (100, 101, 110 or 111, respectively) is represented the fourth input to each of the multiplexers is selected. Bits 1 through 7 of the output of multiplier 53 are connected to the first inputs of the multiplexers, bits 2 through 8 to the second input of the multiplexers, 3 to 9 to the third inputs of the multiplexers and 4 through 10 to the fourth inputs of the multiplexers. The priority encoder, which may be for example a commerically available encoder sold under the part SN74LS148, controls the routing of the data through the multiplexer portion of circuit 50. Thus, ROM 26, which is incremented to the correct azimuth group, selects the correct segment in ROM 48 and the correct output of each of the multiplexers in the priority encoder and multiplexer circuit 50. The output of the multiplexers in the circuit 50 is then utilized to address the correct output in the selected segment of ROM 48 so that outputs are correctly scaled regardless of the azimuth group in which the output is obtained and, consequently, the number of PRI over which the integration is performed.

The design is inherently flexible due to the use of ROMs 26 and 48. While the embodiment described assumes a pixel aspect ratio of 1 to 1, the system can easily be adjusted to different aspect ratios. As an example, for an aspect ratio of 4 to 3, the azimuth cell size is 22.5 meters and the ranges for the new azimuth cell sizes will change. ROM 26, is then changed to account for the new azimuth cell size. For a 4 to 3 pixel output ratio a 4 bit code is needed in RAM 25 and ROM 26. Also the data lines connecting these and the associated parts, multiplexer 42, delay 47, etc. are 4 bits wide. For additional flexibility, random access memories, and an interface to the external control computer, could be used. These RAMs would be loaded with the appropriate data prior to the start of maping run.

Figure 3:
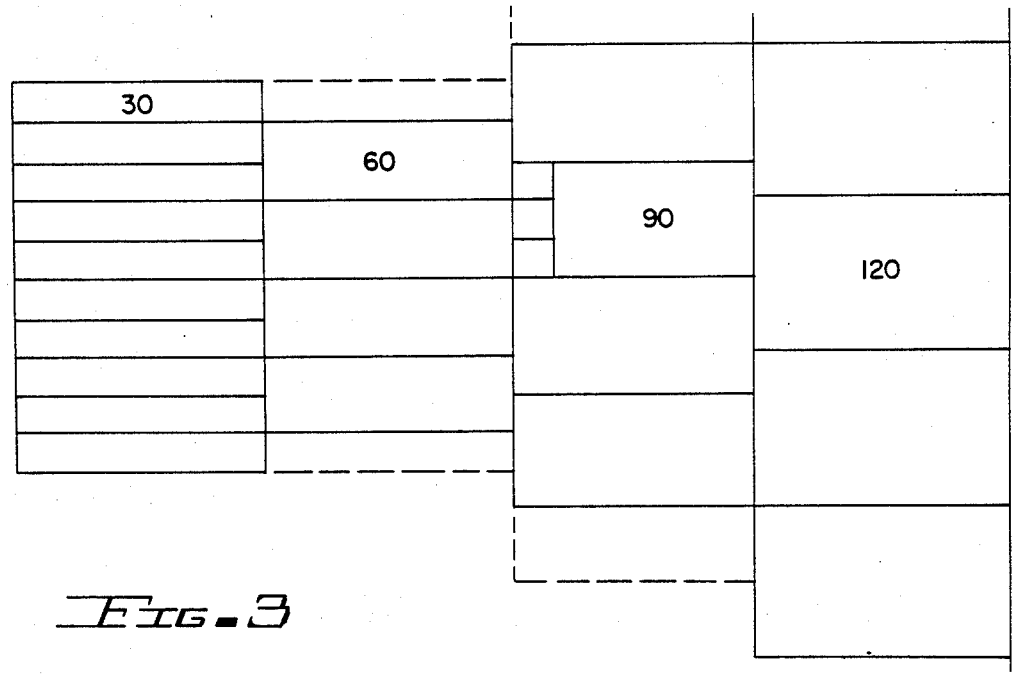
FIG. 3 is a portion of a visual display on a raster scan CRT, illustrating several groups of azimuth cells.

FIG. 3 illustrates the manner in which the different azimuth cells are interleaved to provide a raster scan. The left-hand edge of the figure represents the path of the airplane (traveling toward the top of the figure) with the range becoming greater towards the right-hand edge. Because there is a delay in the time that video data from various azimuth cells reaches the CRT (because of different integration periods) the picture will be skewed slightly, but it will be so slight as to be virtually unnoticeable.

While I have shown and described a specific embodiment of this invention, further modifications and improvements will occur to those skilled in the art. I desire it to be understood, therefor, that this invention is not limited to the particular form shown and I intend in the appended claims to cover all modifications which do not depart from the spirit and scope of this invention.

We claim:
1. Apparatus for providing azimuth cells having a relatively constant size in a radar beam, said apparatus comprising:
   an airborne radar having a transmission beam of fixed width, said radar providing synchronizing pulses and video data;
   integrating means coupled to said radar for dividing the radar beam into range bins and integrating the video data in each range bin in resonse to the synchronizing pulses, said integrating means including an analog to digital converter coupled to receive the video data from the radar and convert it to digital data signals, a random access memory for storing digital data signals and digital adder connected to add new and stored digital data signals and to supply the sum to the random access memory for storage;

timing means coupled to said integrating means for dividing the range bins into azimuth cells in accordance with the number of synchronizing pulses provided per unit distance of travel and controlling said integrating means to integrate the video data in each range bin over an entire azimuth cell; and dividing means coupled to said integrating means for receiving summation signals representative of the sum of all of the digital data signals in each range bin for an entire azimuth cell and dividing the summation signals by the number of synchronizing pulses provided during the azimuth cell.

2. Apparatus as claimed in claim 1 including scaling means coupled to the dividing means and the timing means, said scaling means including an addressable memory having ranges of digital data signals stored therein and addressing means connected to receive signals from the dividing and timing means and utilize the signals to address the correct, stored digital data signal for providing correctly scaled digital data output signals.

3. Apparatus as claimed in claim 2 wherein the addressable memory contains a range of digital data signals for each of the azimuth cells and the signal from the timing means is utilized to address the correct range for the azimuth cell being integrated.

4. Apparatus as claimed in claim 3 including in addition encoding means connected to receive signals from the multiplying and timing means and supply address signals to the addressable memory for scaling the address signals to address substantially equal digital data signals in each of the ranges for similar signals from the dividing means.

5. Apparatus as claimed in claim 4 wherein the encoding means includes a multiplexer connected to accept a predetermined number of bits, less than the total, in the signal from the multiplying means, the predetermined number including the most significant containing a digital one.

6. Apparatus as claimed in claim 2 wherein the timing means and the addressable memory each include a read-only-memory having data therein for providing a predetermined aspect ratio, said read-only memories being changeable to provide a different aspect ratio.

* * * * *